(No Model.)

F. C. DURANT.
CUTTING PUNCH FOR BICYCLISTS' USE.

No. 555,234. Patented Feb. 25, 1896.

WITNESSES:

INVENTOR:

UNITED STATES PATENT OFFICE.

FREDERICK C. DURANT, OF NEW YORK, N. Y., ASSIGNOR TO ARTHUR H. LEA, OF PHILADELPHIA, PENNSYLVANIA.

CUTTING-PUNCH FOR BICYCLISTS' USE.

SPECIFICATION forming part of Letters Patent No. 555,234, dated February 25, 1896.

Application filed June 14, 1895. Serial No. 552,784. (No model.)

*To all whom it may concern:*

Be it known that I, FREDERICK C. DURANT, of New York, in the State of New York, have invented certain new and useful Improvements in Tools for Bicyclists' Use, &c., whereof the following is a specification, reference being had to the accompanying drawings.

Figure 1:
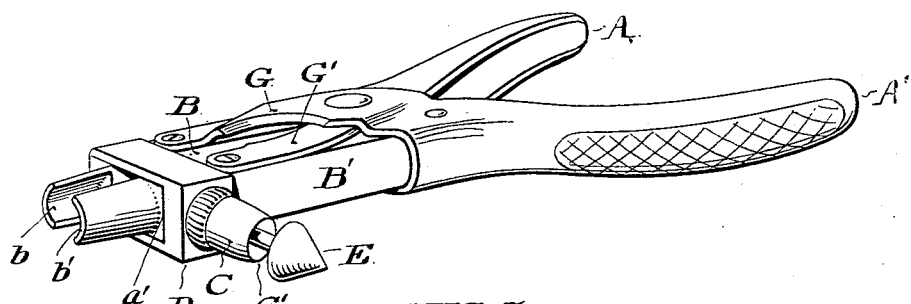
Figure 3:
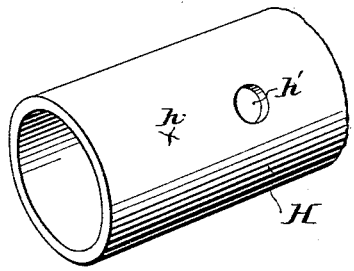
Figure 2:
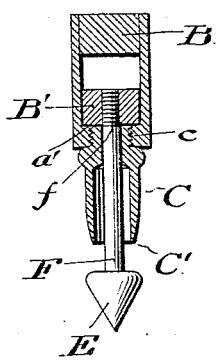

In said drawings, Figure 1 is a view in perspective of a tool embodying my invention. Fig. 2 is a partial sectional view showing details of the device, the plane of section coinciding with the axis of the cutting-punch, which constitutes the main element thereof. Fig. 3 is a view of a piece of tubular material, illustrating the effect of the cutting operation.

The primary object of my invention is to provide means for cutting a symmetrical hole through pliable or elastic material whose form is such that only one side of it is, so to speak, accessible—as, for instance, a rubber tube, like a bicycle-tire.

As the most important use which I contemplate for the invention is the provision of a suitablle tool for bicyclists, I will proceed to describe it with reference thereto without, of course, limiting my invention to that particular employment.

One of the ordinary annoyances to which bicyclists are exposed is the puncturing of the tubular tire and consequent escape of the air. It has been customary to repair such leaks in a crude way, sometimes by means of a patch applied to the exterior and more frequently by means of a rubber plug or rivet, shaped somewhat like a mushroom, whose head is forced through the puncture and whose stem projects outwardly therethrough, being cemented with as tight a joint as the irregular edges of the puncture will permit.

I have found that by "cutting out" the irregular puncture as far as possible and making a symmetrical hole in the tire the stoppage of the leak is greatly facilitated, especially where the rubber plugs are used, as the cylindrical stem of the plug will fit accurately and with uniform pressure in a round hole, and a much better joint can be thus obtained.

The difficulty of cutting a hole through a rubber tube whose interior is, so to speak, inaccessible lies in the fact that a bearing-surface should be applied on the inner side, against which to cut. The tough and elastic nature of the material renders it difficult to cut at all, and almost impossible to obtain a symmetrical or regular hole without such bearing-surface.

By my present invention, wherever an initial puncture has been made, I am enabled to cut or punch a symmetrical hole at or about the punctured region and to force the headed plug through the same quickly and without difficulty, and also, if desired, to shear or cut off the protruding stem of the plug flush with the surface of the tire. The instruments heretofore suggested for this purpose, so far as I am aware, are inconvenient to handle, and efforts to make a combination-tool adapted both to cut the hole and insert the plug have not been successful, owing to defects in the organization and construction of the parts.

Referring to the drawings, A A' represent the handles of a pair of ordinary "parallel-motion" pliers, whose jaws are indicated at B and B', respectively. Said jaws are preferably formed with longitudinal recesses of approximately semicircular cross-section along their inner faces, as shown at b b'. To one jaw, B, is rigidly attached a carrier-yoke D, which freely embraces the other jaw, B', and upon the outer face of said yoke is mounted a laterally-projecting hollow cutting-punch C, whose periphery at the outer end is sharpened, as indicated at C'. Said cutting-punch is in this instance screwed into the carrier-yoke by means of a threaded shank c in order to permit the removal of the cutting-punch and its replacement by one of a different diameter if desired.

A conical anvil-head E is mounted upon the outer end of a stem F, which extends freely through the tubular cutting-punch C and also through the adjacent end of the carrier-yoke D, being detachably secured in the outer face of the embraced jaw a' by means of a screw-thread on the end f.

At a convenient region upon the pliers—as, for instance, upon the jaws B B' below the yoke D—are formed shear edges G G, which overlap slightly, so as to be available for cutting rubber.

The use of the device may be illustrated as follows: In Fig. 3, H indicates a rubber tube or other similar structure through which a ragged puncture $h$ is supposed to have been made, which it is desired to "cut out" or symmetrically enlarge into a hole, such as $h'$. To effect this purpose the anvil-head E is forced through the puncture $h$, which operation is readily permitted by the elasticity and yielding character of the material. When once inside the flat base of the head fits firmly up against the inner side of the tube and the walls of the puncture close tightly around the stem. The operator then closes the jaws of the pliers and forces the cutting-edge $C'$ through the material and against the bearing-surface of the anvil-head, and as a solid bearing is opposed to the cutting-edge $C'$ a symmetrical hole can be very easily punched through the material. The anvil-head is then withdrawn through said hole and a result is attained, such as indicated at $h'$ in Fig. 4. The base or stem of the plug beneath the head thereof is then grasped firmly by the jaws of the pliers, whose internal recessed faces facilitate holding it, and the head is forced through the hole, the head and stem being cemented in position in the usual way. When this operation is complete the protruding end can then be sheared off by the jaws $G$ $G'$.

The cutting-punch and anvil are preferably made removable, so that either or both may be replaced by another of different size, though usually a single anvil-head will suffice, as the material with which the device is to be generally employed will permit the insertion of quite a large anvil-head through even a small puncture.

I prefer to use the parallel-motion type of pliers, because by this construction the necessity of providing play for the anvil-stem is avoided, and the cutting-edge strikes squarely against the material, instead of moving in an arc. I do not, however, limit myself in all my claims to such form of pliers.

By the construction above described I preserve the integrity of the pliers and do not interfere with their specific use, while at the same time I obtain a maximum of efficiency and facilitate the operation for the cutting devices.

I of course do not claim, broadly, the idea of cutting against an anvil-head, for I am aware that such principle is not, broadly speaking, new, nor do I claim broadly the use of jointed arms as a means of actuating the cutting-punch.

My invention is designed to overcome the disadvantages which attend the use of such devices as are shown, for instance, in Patent No. 537,933, dated April 23, 1895, where the device for the insertion of the plug is necessarily located in a most disadvantageous position, and the hand of the operator is liable to be injured by the anvil-head when it is attempted to force the plug into the hole.

In my invention the peculiar combination of the cutting-punch with the plier-jaws permits the ordinary and normal use of the latter.

Although I have described the device as generally intended for use upon a tube, it is obvious that its employment is not necessarily so restricted, as it is well adapted for cutting any material which cannot be embraced by the jaws of an ordinary punch, or only one surface of which is accessible.

Obviously I do not limit my claims to a circular cutting-edge, nor to the specific form of anvil-head shown, as it is only necessary that the latter should be free-ended—that is to say, supported only from the side which is toward the cutting-punch, so as to be capable of insertion through the initial hole.

I claim—

1. The combination with a pair of pliers, of a carrier-yoke attached to one of the jaws of said pliers and freely embracing the other jaw thereof; a laterally-projecting cutting-punch mounted upon the end of the carrier-yoke, a stem extending freely through said cutting-punch and the adjacent end of said carrier-yoke and mounted in the said embraced jaw of the pliers; and a free-ended anvil-head carried by said stem, substantially as set forth.

2. The combination with a pair of parallel-motion pliers having longitudinally-hollowed jaws, of a carrier-yoke attached to one of the jaws of said pliers and freely embracing the other jaw thereof; a laterally-projecting cutting-punch mounted upon the end of the carrier-yoke; a stem extending freely through said cutting-punch and the adjacent end of said carrier-yoke and mounted in the said embraced jaw of the pliers; and a free-ended anvil-head carried by said stem, substantially as set forth.

3. The combination with a pair of pliers, of a carrier-yoke attached to one of the jaws of said pliers and freely embracing the other jaw thereof; a laterally-projecting cutting-punch mounted upon the end of the carrier-yoke; a stem extending freely through said cutting-punch and the adjacent end of said carrier-yoke and mounted in the said embraced jaw of the pliers; a free-ended anvil-head carried by said stem; and a pair of shearing-edges upon said pliers, substantially as set forth.

FREDERICK C. DURANT.

Witnesses:
JAMES H. BELL,
E. REESE.